(No Model.)
E. B. LOBACH.
COFFEE POT.
No. 399,998. Patented Mar. 19, 1889.
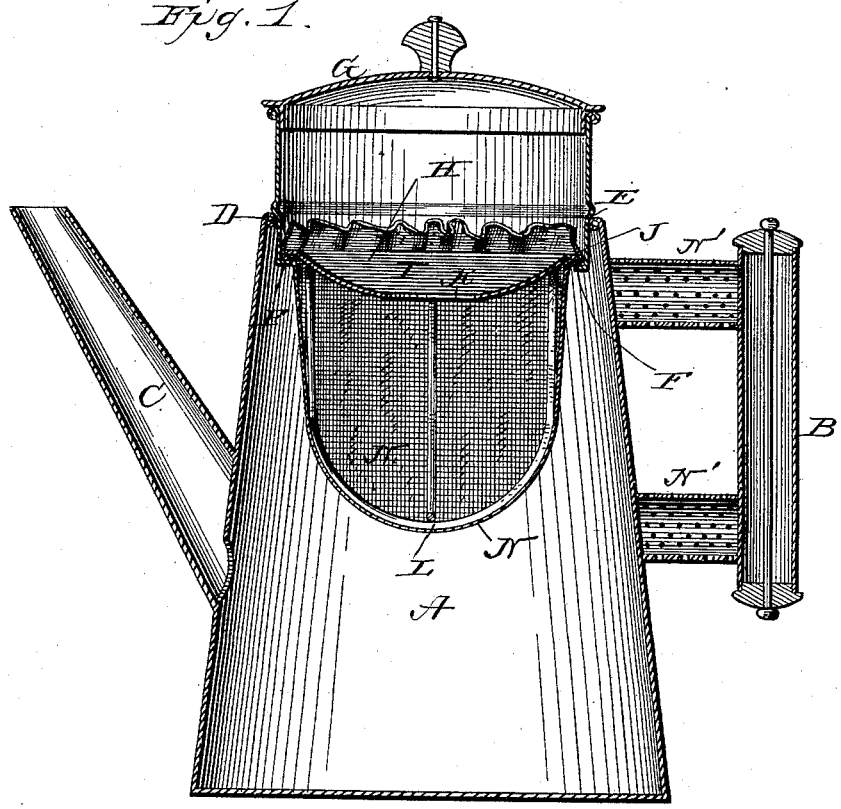
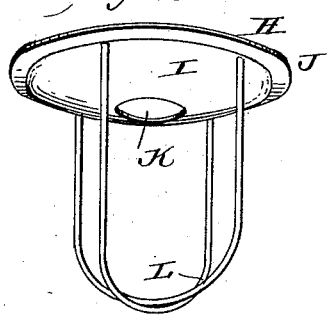
WITNESSES.
F. L. Durand
Benj. G. Cowl
INVENTOR.
Eugene B. Lobach
by Louis Bagger & Co.
Attorneys

United States Patent Office.

EUGENE BLAIR LOBACH, OF DENVER, COLORADO, ASSIGNOR OF ONE-HALF TO H. N. PALMER, OF SAME PLACE.

COFFEE-POT.

SPECIFICATION forming part of Letters Patent No. 399,998, dated March 19, 1889.

Application filed April 26, 1888. Serial No. 271,896. (No model.)

*To all whom it may concern:*

Be it known that I, EUGENE BLAIR LOBACH, a citizen of the United States, and a resident of Denver, in the county of Arapahoe and State of Colorado, have invented certain new and useful Improvements in Coffee-Pots; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal vertical sectional view of my improved coffee-pot. Fig. 2 is a perspective detail view of the percolator basket and disk.

Like letters of reference denote corresponding parts in the several figures.

My invention has relation to that class of coffee-pots which are known as percolators—that is to say, in which coffee is made by pouring boiling water upon finely-ground coffee contained in a receptacle in the upper part of the pot, so as to allow the boiling water to percolate through the ground coffee and drip down into the lower part of the pot; and my improvement consists in the construction and arrangement of the percolating device, as will be hereinafter more fully described and claimed.

In the accompanying drawings, the letter A designates the coffee-pot proper, having the handle B and spout C. On the inner side the pot is adapted to be fitted with a ring or collar, D, having an annular bead, E, which, when this collar is placed in position, rests upon the top of the pot, and provided at its lower end with an inwardly-projecting annular shoulder, F.

G denotes the cover, the flange of which fits within the upper end of the collar D.

The percolating device consists, essentially, of a plate, H, which is depressed or concaved, as shown at I, and provided with an annular rim or flange, J, adapted to rest upon the flange or shoulder F of collar D. In the center of the concavity I is an aperture, K, and fastened to the under side of the flange J by solder or any other suitable means is a basket composed of two bent wires L, crossing each other midway, as will appear more clearly by reference to Fig. 2 of the drawings.

The filter-cloth shown at N is arranged beneath the basket formed by the crossing wires L, and is held in place by being firmly clamped between the flange J and shoulder F. Whenever it is desired to remove the cloth for cleaning, or to renew it, this may readily be done by detaching the plate H from collar D, when the filter-cloth may be removed in a moment of time.

By the construction and arrangement of the concaved plate H in the manner shown and described it will be seen that this disk answers four different purposes, viz: first, it forms a means of attachment for the wires which form the filter-basket; secondly, its flange clamps the filter-cloth against the shoulder of the removable collar; thirdly, when coffee is poured into the pot it guides the ground coffee through the aperture K to the middle of the filter-basket; and, fourthly, in like manner it serves to convey the boiling water upon the middle part of the ground coffee contained in the filter, so that the water will thoroughly percolate the entire charge of coffee.

In order to prevent the handle of my improved coffee-pot from becoming heated, I construct the parts N' N', which connect the handle proper to the body of the pot, of foraminated sheet metal, whereby air is permitted to circulate freely through said parts of the handle, so that the same will always be kept cool. This construction of the handle does not increase the cost of the pot, and rather adds to its appearance than otherwise.

Having thus described my invention, I claim and desire to secure by Letters Patent of the United States—

In a coffee-pot, the combination of the collar D, having the inward-projecting flange F formed on its lower end, the concaved plate H, having the opening K and wire loops L, the outward-projecting flange J, adapted to engage the flange F, and the filter-cloth N, arranged beneath the loops L and secured between the flanges F and J, substantially as described.

In testimony that I claim the foregoing as my own I have hereunto affixed my signature in presence of two witnesses.

EUGENE BLAIR LOBACH.

Witnesses:
H. N. PALMER,
J. D. STEVES.